(12) United States Patent
Wakisaka et al.

(10) Patent No.: US 8,791,209 B2
(45) Date of Patent: Jul. 29, 2014

(54) MODIFIED NATURAL RUBBER PARTICLE, PRODUCTION METHOD THEREOF, AND MODIFIED NATURAL RUBBER LATEX

(71) Applicants: Tokai Rubber Industries, Ltd., Komaki (JP); National University Corporation Nagaoka University of Technology, Nagaoka (JP)

(72) Inventors: Osamu Wakisaka, Kasugai (JP); Akihiro Shibahara, Inuyama (JP); Seiichi Kawahara, Nagaoka (JP); Yoshimasa Yamamoto, Nagaoka (JP); Nanthaporn Pukkate, Komaki (JP)

(73) Assignees: Tokai Rubber Industries, Ltd., Komaki-Shi (JP); National University Corporation Nagaoka University of Technology, Nagaoka-Shi (JP)

( * ) Notice: Subject to any disclaimer, the term of this patent is extended or adjusted under 35 U.S.C. 154(b) by 0 days.

(21) Appl. No.: 13/685,259

(22) Filed: Nov. 26, 2012

(65) Prior Publication Data

US 2013/0144012 A1    Jun. 6, 2013

Related U.S. Application Data

(62) Division of application No. 13/001,487, filed as application No. PCT/JP2009/062530 on Jul. 9, 2009, now Pat. No. 8,357,758.

(30) Foreign Application Priority Data

Jul. 11, 2008  (JP) ................. 2008-182064

(51) Int. Cl.
  *C08F 253/00* (2006.01)
  *C08C 19/28* (2006.01)
  *C08F 8/14* (2006.01)
  *C08F 222/10* (2006.01)

(52) U.S. Cl.
  CPC ............... *C08F 253/00* (2013.01); *C08C 19/28* (2013.01); *C08F 8/14* (2013.01); *C08F 222/1006* (2013.01)
  USPC ........... 525/313; 525/303; 525/305; 525/307; 525/332.1

(58) Field of Classification Search
  CPC .... C08F 253/00; C08F 8/14; C08F 222/1006; C08C 19/28
  USPC ......... 525/244, 252, 253, 301, 302, 304, 305, 525/308, 315, 303, 307, 332.1, 313
  See application file for complete search history.

(56) References Cited

U.S. PATENT DOCUMENTS

| | | | |
|---|---|---|---|
| 3,898,301 A | 8/1975 | Konishi et al. | |
| 4,209,371 A | 6/1980 | Lee | |
| 5,288,798 A * | 2/1994 | Koshirai et al. | 525/63 |
| 5,786,428 A | 7/1998 | Arnold et al. | |
| 8,357,758 B2 * | 1/2013 | Wakisaka et al. | 525/252 |
| 2007/0135604 A1 | 6/2007 | Tashiro et al. | |
| 2007/0191578 A1 | 8/2007 | Tashiro et al. | |

FOREIGN PATENT DOCUMENTS

| | | |
|---|---|---|
| JP | A-08-059704 | 3/1996 |
| JP | A-2000-143600 | 5/2000 |
| JP | A-2001-288228 | 10/2001 |
| JP | B2-3294903 | 6/2002 |
| JP | A-2002-212376 | 7/2002 |
| JP | A-2003-012736 | 1/2003 |
| JP | A-2004-027445 | 1/2004 |
| JP | A-2004-155884 | 6/2004 |
| JP | A-2005-015516 | 1/2005 |
| JP | B2-4025868 | 12/2007 |

OTHER PUBLICATIONS

Machine Translation of JP 2004-027445 (2013).*
Makuuchi et al., "Radiation Vulcanization of Natural Rubber Latex with Polyfunctional Monomers," *Journal of Applied Polymer Science*, 1984, pp. 965-976, vol. 29, John Wiley & Sons, Inc.
Kawahara et al., "Relationship Between Nano-Matrix-Structure and Viscoelastic Properties," vol. 55, pp. 72 & 73, Nagaoka University of Technology and Kyoto Institute of Technology, 2007.
Kawahara et al., "FIB-SEM and TEMT Observation of Highly Elastic Rubbery Material with Nanomatrix Structure," *Macromolecules*, vol. 41, pp. 4510-4513, American Chemical Society, 2008.
Sep. 29, 2009 International Search Report issued in International Patent Application No. PCT/JP2009/062530.
Jul. 6, 2011 Extended European Search Report issued in European Patent Application No. 09 79 4498.7.

(Continued)

*Primary Examiner* — Mark Kaucher
(74) *Attorney, Agent, or Firm* — Oliff PLC

(57) ABSTRACT

A modified natural rubber particle having carbon-carbon double bands assigned to multifunctional vinyl monomers graft-copolymerized onto the surface of the modified natural rubber particle, which is prepared by graft-copolymerization of multifunctional vinyl monomers having two or more carbon-carbon double bonds onto natural rubber particles or deproteinized natural rubber particles. One of the methods for producing a modified natural rubber particle includes the steps of: forming inclusion complex of the multifunctional vinyl monomers having two or more carbon-carbon double bonds with a guest-protecting agent to protect at least one of the double bonds of the multifunctional vinyl monomers; graft-copolymerizing the resulting inclusion complex onto natural rubber particles or deproteinized natural rubber particles; and deprotecting the protected double bonds by removing the guest-protecting agent from the obtained graft-copolymer.

1 Claim, 9 Drawing Sheets

(56) References Cited

OTHER PUBLICATIONS

Aug. 5, 2011, International Preliminary Report on Patentability issued in International Patent Application No. PCT/JP2009/062530.

Mar. 20, 2013 European Office Action issued in European Application No. 09 794 498.7.

Aug. 29, 2013 European Office Action issued in European Application No. 09 794 498.7.

* cited by examiner

MODIFIED NATURAL RUBBER PARTICLE, PRODUCTION METHOD THEREOF, AND MODIFIED NATURAL RUBBER LATEX

This is a Division of application Ser. No. 13/001,487 filed Dec. 27, 2010, which in turn is a 35 U.S.C. 371 of PCT/JP2009/062530, filed Jul. 9, 2009. The disclosure of the prior applications is hereby incorporated by reference herein in its entirety.

TECHNICAL FIELD

The present invention relates to natural rubber particle modified by grafting a multifunctional vinyl monomer, a production method thereof, and a modified natural rubber latex.

BACKGROUND ART

Natural rubber has excellent properties such as high tensile strength and small heat buildup caused by vibration. Therefore, natural rubber has been utilized in a wide variety of applications such as a tire, a belt and a rubber glove. In addition, in view of environmental protections such, as the conservation of resources and the reduction of carbon dioxide emissions, natural rubber is attracting attention as an alternative to synthetic rubber.

However, natural rubber is also known to be inferior in heat resistance, oil resistance, ozone resistance, etc. in comparison with, synthetic rubber. Therefore, in order to superadd excellent properties to natural robber without sacrificing the outstanding properties of natural rubber, attempts to modify natural rubber through grafting, epoxidation, hydrogenation, etc. have been made thus far. For example, in Patent Citations 1 and 2, a technology for graft-copolymerizing a monomer with an unsaturated bond onto deproteinized natural rubber is introduced. In addition, in Patent Citation 3, a technology for forming crosslinking junctions between rubber molecules through a reaction, of a monomer having two or more vinyl groups to natural rubber latex is introduced.

CITATION LIST

Patent Citation 1: Publication of Japanese Patent No. 3294903
Patent Citation 2: Publication of Japanese Patent No. 4025868
Patent Citation 3: Publication of Japanese Patent Application No. 2003-12736

SUMMARY OF THE INVENTION

Technical Problem

In Patent Citations 1 and 2, a monomer used for the graft-copolymerization onto deproteinized natural rubber has only one carbon-carbon double bond (C=C) (for example, methyl methacrylate and stymie). This double bond, is consumed during graft-copolymerization. Therefore, on the surface of the grafted natural rubber particles, there is no carbon-carbon double bond derived from the monomer. In other words, a grafted polymer on the surface of the natural rubber particles has no reactive site. Accordingly, the grafted polymers cannot be chemically bonded to each other by crosslinking. In addition, the development of a new function through an interaction and/or reaction with fillers or additives blended during processing the rubber cannot be expected.

Meanwhile, according to Patent Citation 3, a monomer having two or more vinyl groups is reacted with natural rubber latex. The monomer used in the reaction has two or more carbon-carbon double bonds. However, almost all vinyl groups (carbon-carbon double bonds) are consumed, due to grafting the monomer onto natural rubber particles and forming crosslinking junctions. Therefore, the grafted polymer on the surface of the grafted natural rubber particles has no reactive site. In addition, in the modified rubber latex described in Patent Citation 3, the natural rubber particles are covered with a grafted polymer layer in which the monomers are polymerized. In addition, between rubber molecules, crosslinking junctions are formed. Therefore, for example, when the amount of the monomer used for the grafting increases, a strain occurs between the grafted polymer and the natural rubber particles, which may cause a problem with a film-forming property. The grafted polymer layer formed by the method described in Patent. Citation 3 is easily destroyed in the course of processing such as rubber kneading. Therefore, it is difficult to process the modified natural rubber latex, and the effects due to the modification are reduced.

The present invention was devised in view of the above, and the present invention provides a modified natural rubber particle that is highly reactive by retaining carbon-carbon double bonds derived from graft-copolymerized monomers on the surface of the modified natural rubber particle, and a modified natural rubber latex containing the modified natural rubber particle. Moreover, the present invention provides a production method of the modified natural rubber particles.

Solution to Problem (1) According to a first aspect of the present invention, a modified natural rubber particle has carbon-carbon double bonds assigned to multifunctional vinyl monomers graft-copolymerized onto the surface of the modified natural rubber particle, which is prepared by graft-copolymerization of multifunctional vinyl monomers having two or more carbon-carbon double bonds onto natural rubber particles or deproteinized natural rubber particles.

On the surface of the modified natural rubber particle according to the first aspect of the present invention, carbon-carbon double bonds remain in the multifunctional vinyl monomers, thus graft-copolymerized. The carbon-carbon double bonds become reactive sites for crosslinking etc. Accordingly, for example, by subjecting a solid containing the modified natural rubber particle to photocrosslinking etc., a three dimensional network structure can be formed in a grafted polymer layer. By this treatment, grafted polymers are strongly bonded to each other through a covalent bond. As a result, it is possible to improve tensile property and other properties of the rubber material after the crosslinking. In addition, the grafted polymer layer is hardly destroyed by deformation. Therefore, the dimensional stability of the rubber material after the crosslinking is also improved.

Further, due to the presence of the carbon-carbon double bonds on the surface, in the case of mixing the modified natural rubber particle according to the first aspect of the present invention with other rubber materials or fillers, the compatibility may be improved. With respect to the modified natural rubber particle according to the first aspect of the present invention, heat resistance etc., which have been a problem particular to the natural rubber, is improved by grafting the multifunctional vinyl monomers. Thus, the modified natural rubber particle according to the first aspect of the present invention is useful as an alternative to synthetic rubber.

(2) According to a second aspect of the present invention, a modified natural rubber latex contains the modified natural rubber particle according to the first aspect of the present invention.

The modified natural rubber latex according to the second aspect of the present invention is highly reactive and is well compatible with other rubber materials or fillers. In addition, with the modified natural rubber latex according to the second aspect of the present invention, various rubber products satisfying the strength required can be produced.

(3) According to a third aspect of the present invention, a first method for producing a modified natural rubber particle having carbon-carbon double bonds assigned to multifunctional vinyl monomers graft-copolymerized onto the surface of the modified natural rubber particle includes the steps of: forming inclusion complex, of the multifunctional vinyl monomers having two or more carbon-carbon double bonds with a guest-protecting agent to protect at least one of the double bonds of the multifunctional vinyl monomers; graft-copolymerizing the resulting inclusion complex, onto natural rubber particles or deproteinized natural rubber particles; and deprotecting the protected double bonds by removing the guest-protecting agent from the obtained graft-copolymer.

When the multifunctional vinyl monomers having two or more carbon-carbon double bonds are graft-copolymerized as it is onto the natural rubber particles, it is difficult to retain the carbon-carbon double bonds on the surface of the natural rubber particles. This is because, when the reactivities of the carbon-carbon double bonds in the multifunctional vinyl monomers are the same as each other, it is difficult to control these reactivities, and so during the grafting, all of the double bonds react.

In this point, by the first production method according to the third aspect of the present invention, at least one of the carbon-carbon double bonds in the multifunctional vinyl monomers is protected with the guest-protecting agent beforehand. By graft-copolymerizing the inclusion complex, in which a part of the double bonds is protected, onto the natural rubber particles etc., the grafting can be performed while retaining a part of the double bonds (that is, while not reacting a part of the double bonds). Accordingly, by the first production method according to the third aspect of the present invention, even when the reactivities of the carbon-carbon double bonds are the same as each other, the modified natural rubber particle having the carbon-carbon double bonds in the graft-copolymerized multifunctional vinyl monomers on the surface thereof can be reliably obtained.

(4) According to a fourth aspect of the present invention, a second method for producing a modified natural rubber particle having carbon-carbon double bonds assigned to multifunctional vinyl monomers as a source for graft-copolymerization on the surface of the modified natural rubber particle includes the step of graft-copolymerizing multifunctional vinyl monomers having two or more carbon-carbon doable bonds, at least one of which is distinguished in reactivity from the other double bonds, onto natural rubber particles or deproteinized natural rubber particles.

In the second method according to the fourth aspect of the present invention, multifunctional vinyl monomers having carbon-carbon double bonds that are distinguished, in reactivity from each other are used. Double bonds of carbon having a low reactivity are not reacted and tend to remain daring the graft-copolymerization. Therefore, by the second production method according to the fourth aspect of the present invention, the modified natural rubber particle having the carbon-carbon double bonds in the multifunctional vinyl monomers graft-copolymerized onto the surface thereof can be obtained without protecting the double bonds. Accordingly, the second production method can reduce the production processes in comparison with the first production method according to the third aspect of the present invention. In other words, by the second production method according to the fourth aspect of the present invention, the above modified natural rubber particle according to the first aspect of the present invention can be produced more simply and at low cost.

EMBODIMENTS OF THE INVENTION

Figure 1:
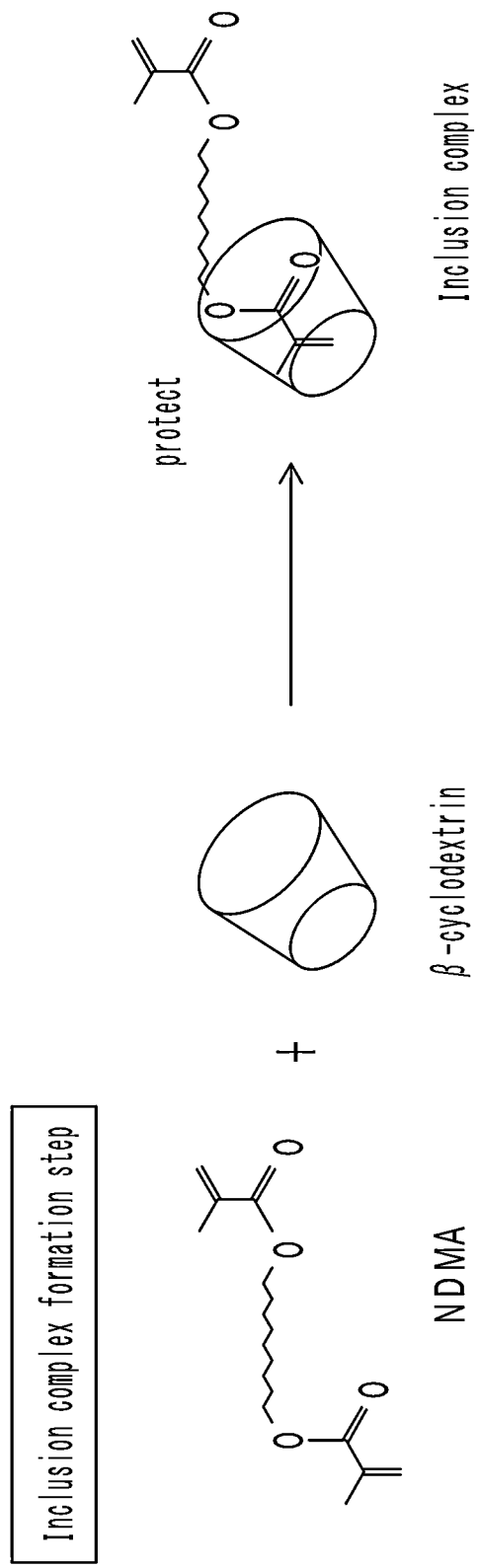
FIG. 1 is a conceptual scheme showing one example of an inclusion complex formation step in a first production method of the present, invention (using 1,9-nonanedioldimethacrylate (MDMA) and β-cyclodextrin)

Hereinafter, a modified natural rubber particle, a modified natural rubber latex and a production method of the modified natural robber particle according to the present invention will be described in detail.

<Modified Natural Rubber Particle>

The modified natural rubber particle according to the present invention has carbon-carbon double bonds assigned to multifunctional vinyl monomers graft-copolymerized onto the surface of the modified natural rubber particle, which is prepared by graft-copolymerization of multifunctional vinyl monomers having two or more carbon-carbon double bonds onto natural rubber particles or deproteinized natural rubber particles.

In the production of the modified natural rubber particle according to the present invention, any one of natural rubber and deproteinized natural rubber in which proteins has been removed may be used. When the deproteinized natural rubber is used, the reaction rate in the graft-copolymerization can be improved.

As the natural rubber, for example, a field latex, or a commercially available ammonia-treated latex etc. may be used. In addition, deproteinization of the natural rubber may adopt various known methods. Examples of the method include (i) a method for decomposing proteins by adding protease or a bacteria to a natural rubber latex (see Japanese Patent Application Publication No. JP-A-6-56902), (ii) a method for cleaning a natural, rubber latex repeatedly using a surfactant such as a soap, and (iii) a method of adding a protein modifier selected from the group consisting of urea-based compounds represented by the following general formula (1) and NaClO to the natural rubber latex and removing the modifier after modification-treating the proteins in the latex (see Japanese Patent Application Publication No. JP-A-2004-99696).

RNHCONH$_2$                                                  (1)

(where, R represents H or an alkyl group having 1 to 5 carbon atoms)

The multifunctional vinyl monomers used for the graft-copolymerization onto the natural rubber particles etc. have two or more carbon-carbon double bonds. "Vinyl monomers" of the present specification mean monomers having a vinyl structure. The vinyl structure includes, besides a vinyl group (—CH═CH$_2$), a mode in which hydrogen atoms in a vinyl group are replaced by substituents such as a methyl group (—CH$_3$). As the multifunctional vinyl monomers, for example, one or more chosen from the following (a) to (c) may be used. Here, "multifunctional (meth)allyl compound" in (b) is a generic name of a multifunctional allyl compound, and a multifunctional methylallyl compound.

(a) a multifunctional vinyl monomer derived from a polyalcohol and an unsaturated carboxylic acid
(b) a multifunctional vinyl monomer derived from a polyalcohol and a multifunctional (meth)allyl compound
(c) a styrene-based multifunctional vinyl monomer Examples of the multifunctional vinyl monomer of (a) include 1,9-nonanedioldimethacrylate (hereinafter, referred to as "NDMA") represented by the following structural formula (2), 3-acryloyloxy-2-hydroxypropyl methacrylate (hereinafter, referred to as "GAM") represented by the following structural formula (3) and glycidyl undecylate methacrylic acid-adduct represented by the following structural formula (4).

[Chemical Formula 1]

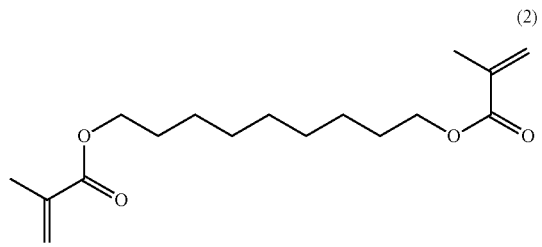

NDMA

[Chemical Formula 2]

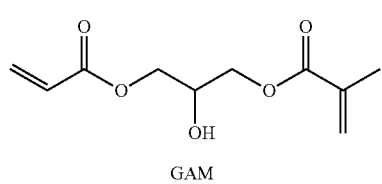

GAM

[Chemical Formula 3]

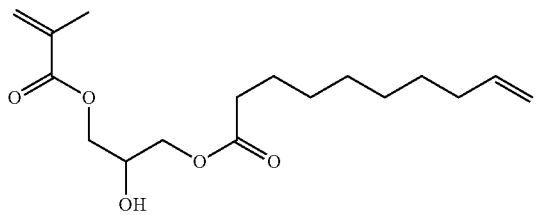

glycidyl undecylate methacrylic Acid-Adduct

Examples of (a) include, besides the above compounds, di(meth)acrylates such as: polyalkylenediol di(meth)acrylates represented by 1,10-decanediol di(meth)acrylate; polyalkylene glycol di(meth)acrylates represented by polytetramethylene glycol di(meth)acrylate; ethylene oxide-propylene oxide-modified bisphenol di(meth)acrylates; and ethylene oxide-propylene oxide-modified alkyl di(meth)acrylates. In addition, examples of (a) further include tri(meth)acrylates produced by using glycerin or trimethylol propane as a polyalcohol, tetra(meth)acrylates produced by using pentaerythritol as a polyalcohol, and modified tris-((meth)acryloxyethyl)isocyanurates.

Examples of the multifunctional vinyl monomers of (b) include 2,2-bis(allyloxymethyl)-1-butanol, diallyl ether, glycerol α,α'-diallyl ether, allyloxy polyethylene glycol-polypropylene glycol mono(meth)acrylates, allyloxy polyalkylene glycol mono(meth)acrylates and allyloxy polyalkyl alcohol mono(meth)acrylates.

Examples of the multifunctional vinyl monomers of (c) include p(m)-divinyl benzene, 1,4-diisopropenyl benzene, bis(vinylphenyl)alkanes, bis(vinylphenyl)alkylene glycols, (vinylphenyl)allylalkanes and (vinylphenyl)allylalkylene glycols.

Among these multifunctional vinyl monomers, for example GAM has a functional group (hydroxyl group: —OH) in the molecule thereof. Therefore, when GAM is graft-copolymerized, not only a carbon-carbon double bond, but also a hydroxyl group becomes a reactive site on the surface of the particles. Accordingly, a crosslinking reaction utilizing the hydroxyl group also becomes possible. Thus, by using multifunctional vinyl monomers having functional groups, the reactive site increases and it can also be expected to impart new functions based on functional groups, for example improving gas-transmission resistance.

The graft-copolymerization of multifunctional vinyl monomers onto the natural rubber particles or the deproteinized natural rubber particles will be described, in detail in the following descriptions of the production method. In addition, the presence or absence of a carbon-carbon double bond derived from multifunctional vinyl monomers on the surface of the particles can be confirmed by, for example, a nuclear magnetic resonance (NMR) measurement.

<Modified Natural Rubber Latex>

The modified natural rubber latex according to the present invention is produced by dispersing the above modified natural rubber particle according to the present invention in an aqueous medium. By the following production method, the modified natural rubber latex according to the present invention can be easily obtained.

<Production Method of Modified Natural Rubber Particles>

(1) The first production, method according to the present invention includes a step for forming an inclusion complex, a step for grafting and a step for deprotecting. Hereinafter, each step will be described in order.

(a) Inclusion Complex Formation Step

This step is a step for forming an inclusion complex of the multifunctional vinyl monomers having two or more carbon-carbon double bonds with a guest-protecting agent to protect at least one of the double bonds of the multifunctional vinyl monomers.

The multifunctional vinyl monomers are as described above. Therefore, here the description thereof is omitted. In this production method also, it is desired with respect to the multifunctional vinyl monomers to adopt the above-described advantageous modes. In addition, in this production method, the reactivity of the carbon-carbon double bonds in the multifunctional vinyl monomers used is not considered. In other words, all of reactivities of the carbon-carbon double bonds may be the same or a part of the reactivities may be different.

As the guest-protecting agent, for example cyclodextrin is suitable. Cyclodextrin includes α-cyclodextrin in which 6 glucopyranose units are bonded in a cyclic form, β-cyclodextrin in which 7 glucopyranose units are bonded in a cyclic form, and γ-cyclodextrin in which 8 glucopyranose units are bonded in a cyclic form. Among them, β-cyclodextrin is inexpensive and therefore preferred. In the center of cyclodextrin, there is a hole. It is hydrophobic in the hole and the carbon-carbon double bond of the multifunctional vinyl monomers is included in the hole.

Figure 2:
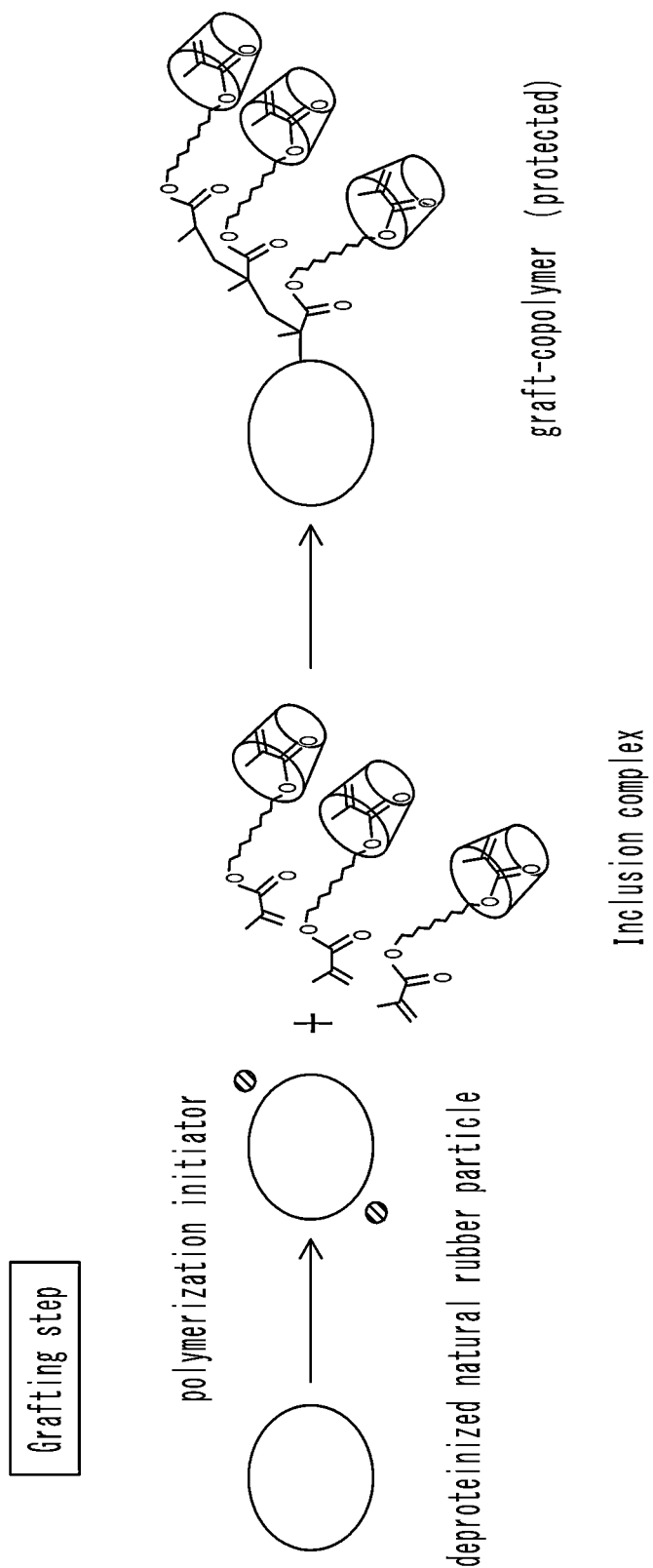
FIG. 2 is a conceptual scheme showing one example of a grafting step in the above production method.
Figure 3:
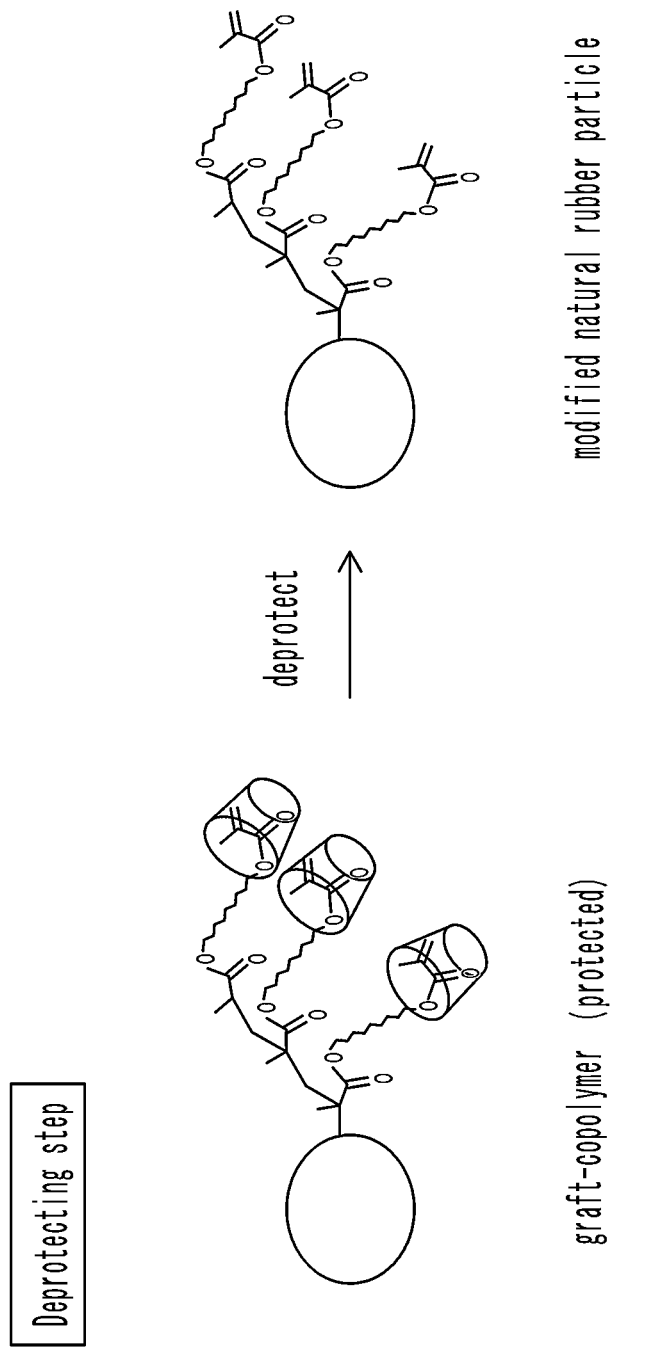
FIG. 3 is a conceptual scheme showing one example of a deprotection step in the above production method.
Figure 4A:
FIG. 4A is a proton nuclear magnetic resonance ($^1$H-NMR) spectrum for a deproteinized natural rubber.
Figure 4B:
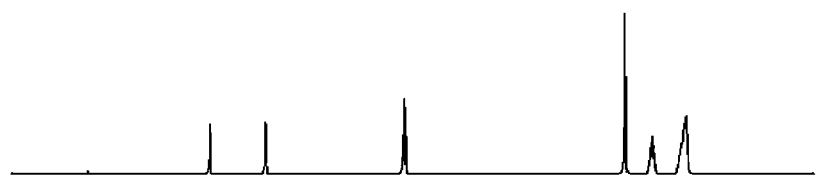
FIG. 4B is a $^1$H-NMR spectrum for NDMA.
Figure 4C:
FIG. 4C is a $^1$H-NMR spectrum for a graft-copolymer produced by graft polymerizing NDMA without using a guest-protecting agent.
Figure 4D:
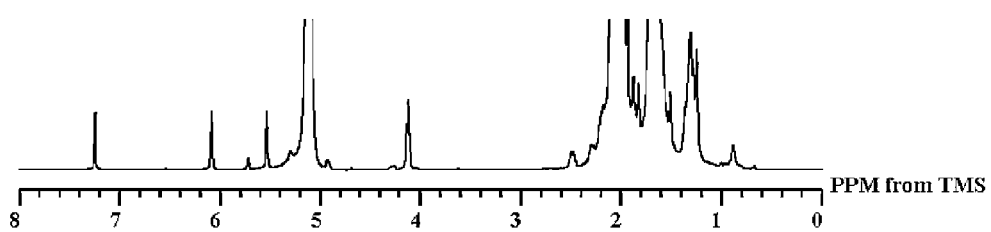
FIG. 4D is a $^1$H-NMR spectrum for the copolymer of Example 2 (NDMA)

FIG. 1 shows a conceptual scheme of an inclusion complex formation with β-cyclodextrin in the case where NDMA is used as the multifunctional vinyl monomers. When FIGS. 1 to 3 are summarized, it becomes a conceptual scheme of a series of steps in this production method. As shown in FIG. 1, NDMA is reacted with β-cyclodextrin. Then, the carbon-carbon double bond at one side of the NDMA is included in the hole of β-cyclodextrin to form an inclusion complex.

The formation of an inclusion complex may be effected by dropping multifunctional vinyl monomers into an aqueous solution of a guest-protecting agent at a predetermined temperature. At this time, the additive amount of the guest-protecting agent relative to the multifunctional vinyl monomers depends on the number of the carbon-carbon double bonds to be protected. However, for example, the additive amount may be guest-protecting agent; multifunctional vinyl monomers=around 1 to 2:1 in the molar ratio. After the completion, of the reaction, the inclusion complex may be filtered off, cleaned with distilled water, and dried.

(b) Grafting Step

This step is a step for graft-copolymerizing the above-formed inclusion complex onto the natural rubber particles or the deproteinized natural rubber particles.

The natural rubber particles or the deproteinized natural rubber particles are as described above. Therefore, here the description thereof is omitted. In this step, a polymerization initiator is added to the latex of natural rubber or deproteinized natural rubber prepared to a predetermined concentration and then, to the resultant mixture, the formed inclusion complex is added to be graft-copolymerized.

Examples of the polymerization initiator include peroxides such as potassium peroxide (KPS), ammonium persulfate (APS), benzoyl peroxide (BPO), hydrogen peroxide, cumene hydroperoxide, tert-butyl hydroperoxide (TBHPO), di-tert-butyl peroxide and 2,2-azobisisobutyronitrile (AIBN). From the viewpoint of lowering the polymerization temperature, a redox-type polymerization initiator may be used. Examples of a reducing agent used in combination with the above peroxides for the redox type polymerization initiator include tetraethylenepentamine (TEPA), mercaptens, sodium hydrogen sulfite, a reductive metal ion and ascorbic acid. Examples of the suitable combination as the redox-type polymerization initiator include TBHPO and TEPA, hydrogen peroxide and $Fe^{2+}$ salts, and KPS and sodium hydrogen sulfite. The additive amount of the polymerization initiator may be 0.01 to 0.3 mol relative to 1 kg of the amount of the rubber content (dry rubber weight, the same as follows) in a latex of natural rubber etc.

In the latex of natural rubber etc., an emulsifying agent may also be added beforehand. As the emulsifying agent, any of known various anionic surfactants, nonionic surfactants and cationic surfactants can be used. Specifically, it is desired to control the surfactant in a range of pH 6 to 13. Examples of the anionic surfactant include carboxylic acid-based, sulfonic acid-based, and sulfate ester-based surfactants. Examples of the nonionic surfactant include polyoxyalkylene ether-based and polyalcohol aliphatic acid ester-based surfactants. Examples of the cationic surfactant include alkylamine salt-type and imidazolimum salt-type surfactants. For example, an anionic surfactant such as sodium dodecylsulfate is preferred.

The additive amount of the inclusion complex is desirably 0.01 to 3 mol relative to 1 kg of the amount of the rubber content in the latex of a natural rubber etc. When the additive amount of the inclusion complex (that is, multifunctional vinyl monomers) is more than 3 mol, a concretion may be generated during the formation. On the contrary, when the additive amount is less than 0.01 mol, the grafted amount of the multifunctional vinyl monomers becomes small and desired effects of modification cannot be obtained.

FIG. 2 shows a conceptual scheme of the graft-copolymerization reaction of the deproteinized natural rubber particles with the inclusion complex formed in the above step (refer to FIG. 1). An initiator is added to a deproteinized natural rubber latex and then, an inclusion complex is added thereto. Then, as shown in FIG. 2, utilizing non-protected carbon-carbon double bond, the inclusion complex is graft-copolymerized onto the surface of the deproteinized natural rubber particles.

The polymerization reaction may be effected at 30 to 90° C. for 0.5 to 12 hours. The obtained graft-copolymer is dried and then subjected to the next deprotection step.

(c) Deprotection Step

This step is a step for removing the guest-protecting agent from the obtained graft-copolymer. When cyclodextrin is used as a guest-protecting agent, for example, distilled water is added to the graft-copolymer, and the resultant mixture is stirred at a temperature of 60° C. or more, so that cyclodextrin is dissolved and removed. After the guest-protecting agent is removed, the product is dried to obtain the modified natural rubber particle having the carbon-carbon double bonds assigned to the multifunctional vinyl monomers graft-copolymerized onto the surface thereof.

FIG. 3 shows a conceptual scheme of the present step. As shown in FIG. 3, by dissolving and removing β-cyclodextrin from the graft-copolymer obtained in the above step, the modified natural rubber particle having the carbon-carbon double bonds derived from NDMA on the surface thereof can be obtained.

(2) The second production method of the present invention is a method for graft-copolymerizing multifunctional vinyl monomers having two or more carbon-carbon double hoods, at least one of which is distinguished in reactivity from the other double bonds, onto natural rubber particles or deproteinized natural rubber particles.

The natural rubber particles or the deproteinized natural rubber particles are as described above. Therefore, the description thereof is here omitted. In addition, in the present production method, the multifunctional vinyl monomers used are limited. In other words, it becomes a condition that in the above-described multifunctional vinyl monomers, among a plurality of carbon-carbon double bonds, at least one double bond is distinguished in reactivity from the other double bonds. Examples of the multifunctional vinyl monomers capable of being used include GAM and allyloxypolyethylene glycol-polypropylene glycol mono(meth)acrylate.

A double bond having a low reactivity tends to remain without being reacted during the graft-copolymerization. Therefore, by the present production method, the modified natural rubber particle having the carbon-carbon double bonds assigned to the multifunctional vinyl monomers graft-copolymerized onto the surface thereof can be obtained without protecting the double bonds. Accordingly, except that multifunctional vinyl monomers are used as they are instead of an inclusion complex, the graft-copolymerization may be performed according to the grafting step of the first production method according to the present invention.

Examples

Each of 4 types of multifunctional vinyl monomers was copolymerized onto the deproteinized natural rubber particles to produce the modified natural rubber particles. The description thereof will be made in order.

<Production of Deproteinized Natural Rubber Latex>

As a natural rubber latex, a high ammonia latex (manufactured by Golden Hope Plantations Berhad (Malaysia); rubber content concentration: 60.2% by weight; ammonia concentration; 0.7% by weight) was used. First, the high ammonia latex was diluted to 30% by weight of rubber content concentration. Next, to the diluted latex, 1.0 part by weight of sodium dodecyl sulfate (SDS: anionic surfactant) relative to 100 parts by weight of rubber content of the diluted latex was added to stabilize the latex. Next, 0.1 parts by weight of urea relative to 100 parts by weight of rubber content of the latex was added to the latex and the resultant mixture was subjected to a protein decomposition treatment by stirring the resultant mixture at room temperature for one hour. Subsequently, the latex with which protein decomposition treatment had been completed was subjected to a centrifugation treatment at 10,000 rpm for 30 minutes. A cream content of the thus separated upper layer was dispersed in water or an SDS aqueous solution to a predetermined rubber content concentration to obtain a deproteinized natural rubber latex.

<Grafting by NDMA>

Using NDMA (refer to the structural formula (2)) as the multifunctional vinyl monomer, the modified natural rubber particles were produced by the first production method according to the present invention. As the guest-protecting agent, β-cyclodextrin was used.

(1) Formation of Inclusion Complex

First, a β-cyclodextrin aqueous solution containing 0.11% by weight of β-cyclodextrin was charged into a separable flask and the inside of the flask was subjected to nitrogen-purge in a water bath for one hour to remove dissolved oxygen in the β-cyclodextrin aqueous solution. Next, while stirring the β-cyclodextrin aqueous solution at a constant temperature of 90° C., NDMA was dropped into the aqueous solution and the reaction was effected for 5 hours. The molar ratio of β-cyclodextrin and NDMA was set to 1:1. After the completion of the reaction, an inclusion complex was filtered off by a suction filtration. The inclusion complex was cleaned with distilled water and vacuum-dried at 50° C. for one week.

(2) Graft-Copolymerization

A deproteinized natural rubber latex prepared to a predetermined rubber content concentration was charged into a stainless steel-made container and the inside of the container was subjected to nitrogen-purge for one hour to remove dissolved oxygen in the latex. While stirring the latex at a predetermined temperature, a polymerization initiator was dropped into the latex and the resultant mixture was stirred for 5 minutes, followed by further adding the inclusion complex in a powder form to the mixture. The additive amount of the inclusion complex was set to 0.1 mol relative to 1 kg of the rubber content. The reaction was effected for a predetermined time and the latex was transferred to a petri dish, followed by drying the latex at 50° C. for one week to obtain a graft-copolymer. In Table 1, the reaction conditions are summarized. In Table 1, the content rate of NDMA was obtained by measuring the graft-copolymer after the deprotection by a Fourier transform infrared spectrophotometer (FT-IR). For the measurement FT/IR-410 (trade name; manufactured by JASCO Corporation) was used.

TABLE 1

|  | Nitrogen introduction method | Rubber content concentration [%] | SDS concentration [%] | Polymerization initiator*[1] | Initiator concentration [mol/kg] | Stirring rate [rpm] | Reaction temperature [° C.] | Reaction time [h] | NDMA content rate [%] |
|---|---|---|---|---|---|---|---|---|---|
| Example 1 | blowing | 20 | 0.1 | KPS | 0.1 | 200 | 60 | 5 | 1.20 |
| Example 2 | blowing | 30 | 0 | KPS | 0.033 | 300 | 60 | 3 | 1.21 |
| Example 3 | blowing | 30 | 0.1 | TBHPO | 0.01 | 100 | 30 | 5 | 1.64 |
| Example 4 | blowing | 30 | 1 | BPO | 0.1 | 200 | 90 | 1 | 2.13 |
| Example 5 | blowing | 30 | 0.1 | TBHPO | 0.1 | 200 | 40 | 1 | 1.74 |

*[1]KPS: potassium persulfate, BPO: benzoyl peroxide, TBHPO: tert-butyl hydroperoxide (3) Deprotection (Removal of Guest-Protecting Agent)

The obtained graft-copolymer (solid) was cut into a square having a size of 20 mm×20 mm and the square graft-copolymer was put into a sample bottle. Distilled water was added into the sample bottle and the content of the bottle was continuously stirred for 5 hours in a water bath at 70 to 80° C. Distilled water was exchanged twice in the course of stirring. Subsequently, the graft-copolymer was air-dried and further vacuum-dried at 80° C. for 24 hours to obtain the graft-copolymer from which the guest-protecting agent was removed. Hereinafter, the produced graft-copolymers will be referred to as copolymers of Examples 1 to 5 corresponding to the numbers of Examples in Table 1.

(4) $^1$H-NMR Measurement

The copolymers of Examples 1 to 5 were measured by a proton nuclear magnetic resonance ($^1$H-NMR) measurement to confirm whether the carbon-carbon double bond was present or not on the surface of the modified natural rubber particles of the copolymers. The measurement was performed using a nuclear magnetic resonance (NMR) apparatus (trade name: AL-400; manufactured by JEOL Ltd.). FIG. 4 shows, as one example, a $^1$H-NMR spectrum for the copolymer of Example 2. In FIG. 4, (D) on the last line is a spectrum for the copolymer of Example 2. As reference, (A) shows a spectrum for a deproteinized natural rubber; (B) shows a spectrum for NDMA; and (C) shows a spectrum for a graft-copolymer produced by graft-copolymerizing NDMA without using a guest-protecting agent.

When comparing (C) and (D) in FIG. 4, in the spectrum (D), signals appear at 5.50 ppm and 6.07 ppm. These signals are, as is apparent from the spectrum (B), signals ascribed of the carbon-carbon double bonds derived from NDMA. The similar signals do not appear in the spectrum (C). Thus, it has been confirmed that on the surface of the copolymer of Example 2, the carbon-carbon double bonds derived from NDMA were present. Here, though it is omitted, to refer to the $^1$H-NMR spectrum, also in the copolymers of Examples 1 and 3 to 5, it was confirmed in a similar manner that the carbon-carbon double bonds derived from NDMA were present. Thus, by protecting the carbon-carbon double bond at one side of the NDMA, the graft-copolymerization can be performed while retaining the carbon-carbon double bonds.

(5) Evaluation of Tensile Property and Viscoelasticity

With respect to the copolymers of Examples 1 to 5, the tensile strength (TS) and the elongation at break ($E_b$) were measured. These measurements were performed according to the Japanese Industrial Standard (JIS) K 6251 (2004). Here, test pieces in a dumbbell shape third form were used. In addition, the copolymers of Examples 1 to 5 were molded into predetermined forms and were photocrosslinked by irradiating ultraviolet (UV) rays thereto for 2 minutes. Also, with respect to each sample after the crosslinking, the tensile strength and the elongation at break were measured in a similar manner. The measurement result is shown in Table 2. In Table 2, the rate of change is a value calculated according to tire following equation: (Rate of change (%)=(value after crosslinking−value before crosslinking)/value before crosslinking). Here, in Table 2, for comparison, the values of the tensile strength and the elongation at break of the deproteinized natural rubber as a raw material are shown together.

Figure 5:
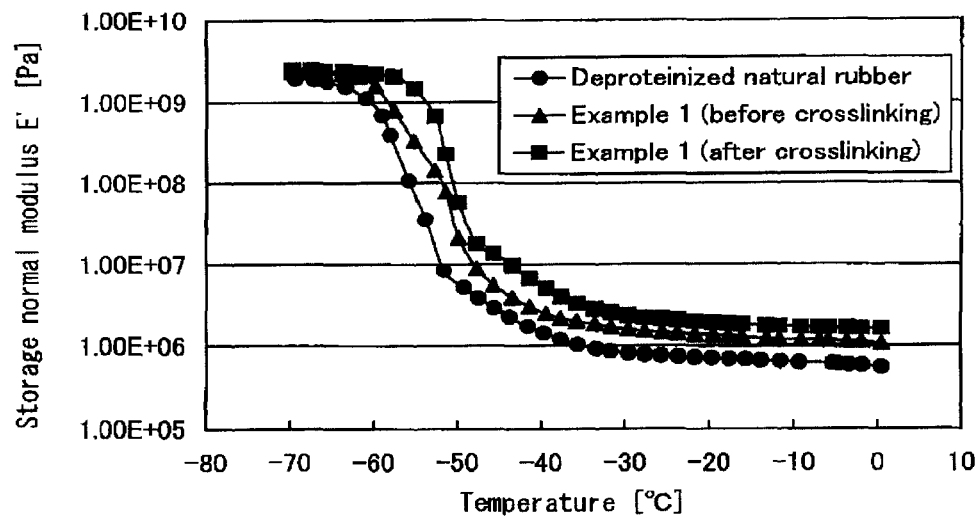
FIG. 5 is a graph showing a relationship between the temperature and the storage normal modulus (E') for the copolymer of Example 1.
Figure 6:
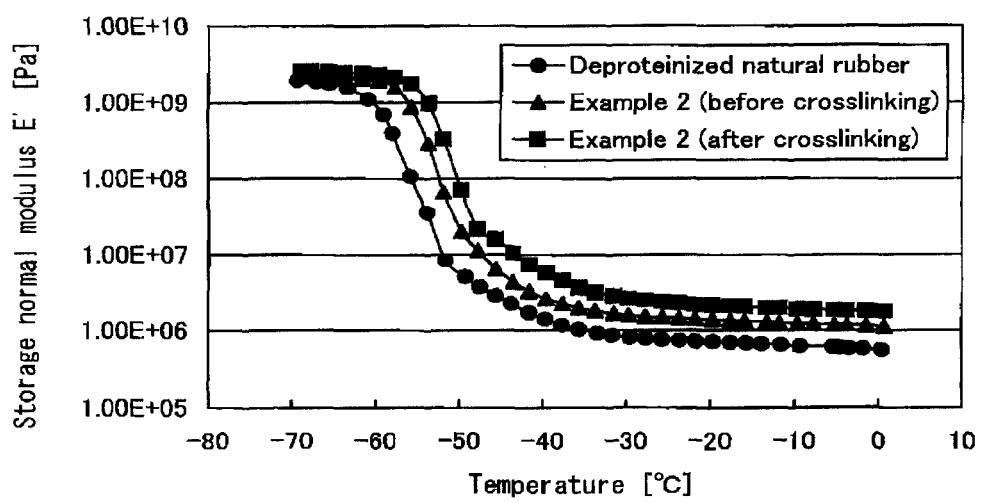
FIG. 6 is a graph showing a relationship between the temperature and the storage normal modulus (E') for the copolymer of Example 2.
Figure 7:
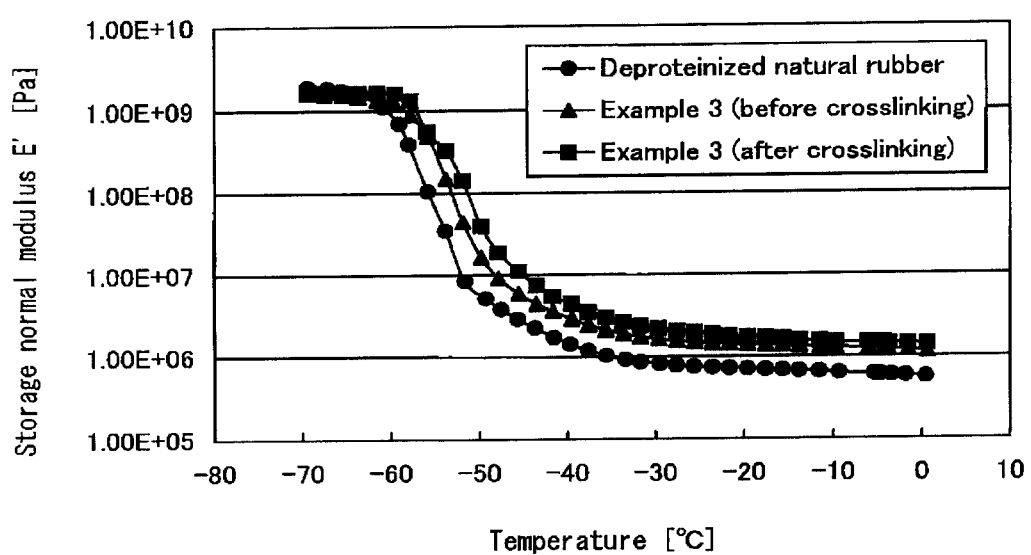
FIG. 7 is a graph showing a relationship between the temperature and the storage normal modulus (E') for the copolymer of Example 3.

Next, with respect to the copolymers of Examples 1 to 5 (including the copolymers after the photocrosslinking), the relationship between the temperature and the storage normal modulus was measured. First, from each copolymer, a test piece in a strip form having a width of 5 mm and a thickness of 1 mm was produced. Next, the produced test piece was set in a dynamic viscoelasticity measuring apparatus (trade name: Rheogel-E 4000; manufactured by UBM Co., Ltd.) to measure the relationship between the temperature and the storage normal modulus. The measurement was performed in a tensile mode under the condition in which a frequency was 1 Hz and a displacement was 10 μm. FIGS. 5 to 7 show the relationships between the temperature and the storage normal modulus (E') for copolymers of Examples 1 to 3. In FIGS. 5 to 7, "E+05" in the ordinate means "×10$^5$". Therefore, for example, "1.00×10$^5$" is expressed as "1.00E+05".

As shown, in FIGS. 5 to 7, the storage normal modulus of any copolymer exhibited a similar tendency as that of the deproteinized natural rubber as a raw material. In addition, the storage normal modulus of copolymers of Examples 1 to 3 were slightly higher than that of the deproteinized natural rubber. This indicates that the structures of the copolymers of Examples 1 to 3 became specific structures by the grafting. In addition, from the fact that by a UV ray irradiating treatment, the graph is shifted to the side of higher temperatures and the storage normal modulus is increased, it can be determined that the photocrosslinking reaction of the carbon-carbon double bonds in the graft-copolymerized NDMA was progressed.

<Grafting by GAM>

Using GAM (refer to the structural formula (3)) as the multifunctional vinyl monomer, one of the modified natural rubber particles were produced by the first production method according to the present invention (Example 8), and other two of the modified natural rubber particles were produced by the second production method according to the present invention (Examples 6 and 7). In the first production method, β-cyclodextrin was used as the guest-protecting agent.

(1) Formation of Inclusion Complex

First, a β-cyclodextrin aqueous solution containing 0.11% by weight of β-cyclodextrin was charged into a separable flask and the inside of the flask was subjected to nitrogen-purge in a water bath for one hour to remove dissolved oxygen

TABLE 2

|  | NDMA content rate [%] | Tensile strength | | | Elongation at break | | |
|---|---|---|---|---|---|---|---|
|  |  | before photo-crosslinking [MPa] | after photo-crosslinking [MPa] | rate of change [%] | before photo-crosslinking [%] | after photo-crosslinking [%] | rate of change [%] |
| Example 1 | 1.20 | 0.54 | 0.78 | 45 | 477 | 287 | −40 |
| Example 2 | 1.21 | 0.80 | 0.89 | 11 | 308 | 108 | −65 |
| Example 3 | 1.64 | 0.71 | 1.66 | 135 | 197 | 202 | 3 |
| Example 4 | 2.13 | 0.41 | 1.23 | 204 | 526 | 260 | −51 |
| Example 5 | 2.63 | 0.82 | 1.68 | 105 | 250 | 180 | −28 |
| Deproteinized natural rubber |  | 0.26 | — | — | 525 | — | — |

As is apparent from Table 2, the tensile strengths of copolymers of Examples 1 to 5 were increased by the crosslinking. On the other hand, since the carbon-carbon double bonds in the graft-copolymerized NDMA were reacted by the crosslinking, die elongations at break were reduced. Evaluating the measurement results of the tensile strength and the elongation at break together, it is considered that the crosslinking was progressed.

in the β-cyclodextrin aqueous solution. Next, while stirring the β-cyclodextrin aqueous solution at a constant temperature of 90° C., GAM was dropped into the aqueous solution and the reaction was effected for 5 hours. The molar ratio of β-cyclodextrin and GAM was set to 1:1. After the completion of the reaction, an inclusion complex was filtered off by a suction filtration. The inclusion complex was cleaned with distilled water and vacuum-dried at 50° C. for one week.

(2) Graft-Copolymerization

A deproteinized natural rubber latex prepared to a rubber content concentration of 10% by weight was charged into a stainless steel-made container and the inside of the container was subjected to nitrogen-purge for one hour to remove dissolved oxygen in the latex. While stirring the latex at a predetermined temperature, a polymerization initiator was dropped into the latex and the resultant mixture was stirred for 5 minutes, followed by further adding the inclusion complex in a powder form, or GAM as it is, to the mixture. The additive amounts of both the inclusion complex and GAM were set to 0.15 mol relative to 1 kg of the rubber content. The reaction was effected for about one hour and then the latex was transferred to a petri dish, followed by drying the latex at 80° C. for 17 hours to obtain a graft-copolymer. In Table 3, the reaction conditions and the like are summarized.

derived from GAM were present. Here, though it is omitted to refer to the $^1$H-NMR spectrum, also in the copolymers of Examples 6 and 8, it was confirmed in a similar manner that the carbon-carbon double bonds derived from GAM were present. Thus, when GAM having carbon-carbon double bonds having different reactivities is used, the graft-copolymerization can be performed while retaining the carbon-carbon double bond even without using a guest-protecting agent.

(5) Evaluation of Tensile Property

With respect to the copolymers of Examples 6 to 8, the tensile strength and the elongation at break were measured. These measurements were performed according to JIS K 6251 (2004) as in Examples 1 to 5. Test pieces in a dumbbell shape third form were used. The measurement result is shown in Table 4. In Table 4, for comparison, the values of the tensile

TABLE 3

|  | Nitrogen introduction method | Rubber content concentration [%] | SDS concentration [%] | Polymerization initiator*$^1$ | Initiator concentration [mol/kg] | Stirring rate [rpm] | Reaction temperature [° C.] | Reaction time [h] |
|---|---|---|---|---|---|---|---|---|
| Example 6 | bubbling | 10 | 0.1 | TBHPO/TEPA | 0.033 | 200 | 30 | 1 |
| Example 7 | bubbling | 10 | 0.1 | KPS | 0.033 | 200 | 75 | 1 |
| Example 8*$^2$ | bubbling | 10 | 0.1 | TBHPO/TEPA | 0.033 | 200 | 30 | 1 |

*$^1$KPS: potassium persulfate, TBHPO: tert-butyl hydroperoxide, TEPA: tetraethylene pentamine
*$^2$Guest-protecting agent is used.

(3) Deprotection (Removal of Guest-Protecting Agent)

The graft-copolymer (solid) synthesized using a guest-protecting agent was cot into a square having a size of 20 mm×20 mm and the square graft-copolymer was put into a sample bottle. Distilled water was added into the sample bottle and the content of the bottle was continuously stirred for 5 hours in a water bath of 70 to 80° C. Distilled water was exchanged twice in the course of stirring. Subsequently, the graft-copolymer was air-dried and further vacuum-dried at 80° C. for 24 hours to obtain the graft-copolymer from which the guest-protecting agent was removed. Hereinafter, the produced graft-copolymers will be referred to as copolymers of Examples 6 to 8 corresponding to the numbers of Examples in Table 3.

(4) $^1$H-NMR Measurement

Figure 8A:
FIG. 8A is a $^1$H-NMR spectrum for deproteinized rubber.
Figure 8B:
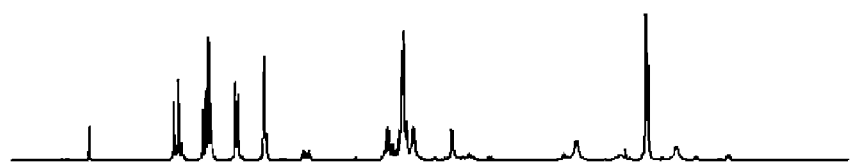
FIG. 8B is a $^1$H-NMR spectrum for 3-acryloyloxy-2-hydroxypropyl methacrylate (GAM)
Figure 8C:
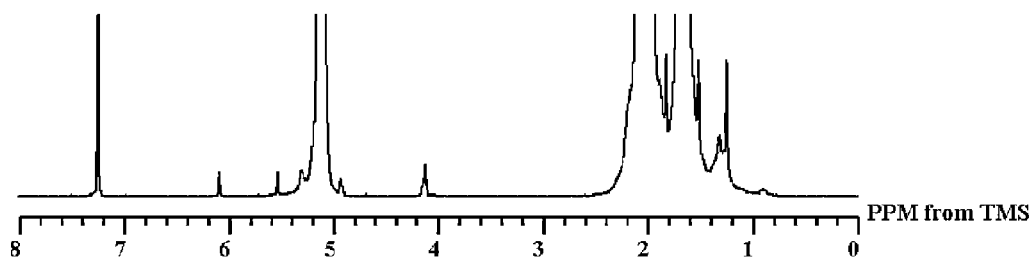
FIG. 8C is a $^1$H-NMR spectrum for the copolymer of Example 7 (GAM)

The copolymers of Examples 6 to 8 were measured by a $^1$H-NMR measurement to confirm whether the carbon-carbon double bond was present or not on the surface of the modified natural rubber particles of the copolymers. The measurement was performed using an NMR apparatus (trade name: AL-400; manufactured by JEOL Ltd.). FIG. 8 shows, as one example, a $^1$H-NMR spectrum for the copolymer of Example 7. In FIG. 8, (C) on the last line is a spectrum for the copolymer of Example 7. As reference, (A) shows a spectrum for a deproteinized natural rubber and (B) shows a spectrum for GAM.

As shown in FIG. 8, in the spectrum (C), signals appear at 5.58 ppm and 6.15 ppm. These signals are ascribed of the carbon-carbon double bonds in the acrylate in GAM. On the other hand, signals appear in the spectrum (B) at 5.80 ppm and 6.43 ppm. These signals are ascribed of the carbon-carbon double bonds in the methacrylate. However, these signals do not appear in the spectrum (C). As is apparent from this result, the carbon-carbon double bond in the methacrylate was preferentially reacted and the carbon-carbon double bond in the acrylate remained.

Thus, it has been confirmed that on the surface of the copolymer of Example 7, the carbon-carbon double bonds strength and the elongation at break of the deproteinized natural rubber as a raw material are shown together.

TABLE 4

|  | Tensile strength [Mpa] | Elongation at break [%] |
|---|---|---|
| Example 6 | 1.04 | 275 |
| Example 7 | 0.80 | 200 |
| Example 8 | 0.89 | 210 |
| Deproteinized natural rubber | 0.26 | 525 |

As shown in Table 4, the tensile strengths of the copolymers of Examples 6 to 8 were increased than that of the deproteinized natural rubber before the modification. In addition, when touching each copolymer with fingers, tack property particular to the natural rubber was reduced and the copolymer became hard. From this result, it can be determined that, as in the case of NDMA, the grafting was progressed.

<Grafting by Glycidyl Undecylate Methacrylic Acid-Adduct>

Using a glycidyl undecylate methacrylic acid-adduct (refer to the structural formula (4)) as the multifunctional vinyl monomer, the modified natural rubber particles were produced by the second production method according to the present invention.

First, a deproteinized natural rubber latex prepared to a rubber content concentration of 20% by weight was charged into a separable flask and the inside of the flask was subjected to nitrogen-purge for one hour to remove dissolved oxygen in the latex. Next, while stirring the latex at a temperature of 60° C., KPS as a polymerization initiator was dropped into the latex and the resultant mixture was stirred for 5 minutes, followed, by further adding glycidyl undecylate methacrylic acid-adduct to the mixture. The additive amount of glycidyl undecylate methacrylic acid-adduct was set to 0.1 mol relative to 100 parts by weight of the rubber content. The reaction was effected for about 3 hours and then the rubber content was recovered by a centrifugation, followed by vacuum-drying the rubber content at 50° C. for one week to obtain a graft-copolymer. Hereinafter, the produced graft-copolymer will be referred to as the copolymer of Example 9.

The copolymer of Example 9 was measured by a $^1$H-NMR measurement to confirm whether the carbon-carbon double bond was present or not on the surface of the modified natural rubber particles of the copolymer. The measurement was performed using an NMR apparatus (trade name: AL-400; manufactured by JEOL Ltd.). As a result, in the spectrum for the copolymer of Example 9, both the signals (at 5.6 ppm and 6.1 ppm) ascribed of the carbon-carbon, double bonds in the methacrylate and the signal (at 4.9 ppm) ascribed of the carbon-carbon double bonds in the allyl group in the glycidyl undecylate methacrylic acid-adduct appeared. Further, by comparing the integrated intensities of both signals with each other, the ratio between remaining amounts of methacrylate and allyl group was calculated. Then, it became apparent that the allyl group remained in an amount more than two times the amount of remaining methacrylate. As is apparent from this result, the carbon-carbon double bond in the methacrylate was preferentially reacted and the carbon-carbon double bond in the allyl group remained. Thus, it has been confirmed that on the surface of the copolymer of Example 9, the carbon-carbon double bonds derived from the glycidyl undecylate methacrylic acid-adduct were present. Thus, when glycidyl undecylate methacrylic acid-adduct having carbon-carbon double bonds with different reactivities is used, the graft-copolymerization can be performed while retaining the carbon-carbon double bond even without using a guest-protecting agent.

<Grafting by Divinylbenzene>

Using divinylbenzene as the multifunctional vinyl monomer, the modified natural rubber particles were produced by the first production method according to the present invention, β-cyclodextrin was used as the guest-protecting agent.

(1) Formation of Inclusion Complex

First, a β-cyclodextrin aqueous solution containing 0.11% by weight of β-cyclodextrin was charged into a separable flask and the inside of the flask was subjected to nitrogen-purge in a water bath by a blowing method for one hour to remove dissolved oxygen in the β-cyclodextrin aqueous solution. Next while stirring the β-cyclodextrin aqueous solution at a constant temperature of 90° C., divinylbenzene was dropped into the aqueous solution and the reaction was effected for 5 hours. The molar ratio of β-cyclodextrin and divinylbenzene was set to 1:1. After the completion of the reaction, an inclusion complex was filtered off by a suction filtration. The inclusion complex was cleaned with distilled water and vacuum-dried at 50° C. for one week.

(2) Graft-Copolymerization

A deproteinized natural rubber latex prepared to a rubber content concentration of 30% by weight by dispersing a deproteinized natural rubber in a SDS aqueous solution containing 0.1% by weight of SDS, was used. First, the deproteinized natural rubber latex was charged into a stainless steel-made container and the inside of the container was subjected to nitrogen-purge by a blowing method for one hour to remove dissolved oxygen in the latex. Next, while stirring the latex at 30° C., tert-butyl hydroperoxide (TBHPO) and tetraethylene pentamine (TEPA) as the polymerization initiators were dropped into the latex in order. The total additive amount of the polymerization initiator was set to 0.07 mol relative to 1 kg of the rubber content. Next, the inclusion complex in a powder form was added, thereto. The additive amount of the inclusion complex was set to 0.1 mol relative to 1 kg of the rubber content. The reaction was effected for about 2 hours and then the latex was transferred to a petri dish, followed by drying the latex at 50° C. for one week to obtain a graft-copolymer.

(3) Deprotection (Removal of Guest-Protecting Agent)

The obtained graft-copolymer (solid) was cut into a square having a size of 20 mm×20 mm and the square graft-copolymer was put into a sample bottle. Distilled water was added into the sample bottle and the content of the bottle was continuously stirred for 5 hours in a water bath of 70 to 80° C. Distilled water was exchanged twice in the course of stirring. Subsequently, the graft-copolymer was air-dried and further vacuum-dried at 80° C. for 24 hours to obtain the graft-copolymer from which the guest-protecting agent was removed. Hereinafter, the produced graft-copolymer will be referred, to as the copolymer of Example 10.

(4) Evaluation of Tensile Property

With respect to the copolymer of Example 10, the tensile strength and the elongation at break were measured. These measurements were performed according to JIS K 6251 (2004) as in Examples 1 to 8. Test pieces in a dumbbell shape third form were used. The measurement result is shown in Table 5. In Table 5, for comparison, the values of the tensile strength and the elongation at break of the deproteinized natural rubber as a raw material are shown together.

TABLE 5

|  | Tensile strength [Mpa] | Elongation at break [%] |
| --- | --- | --- |
| Example 10 | 0.48 | 483 |
| Deproteinized natural rubber | 0.26 | 525 |

As shown in Table 5, the tensile strength of the copolymer of Examples 10 was increased than that of the deproteinized natural rubber before the modification. In addition, when touching the copolymer of Example 10 with fingers, tack property particular to the natural rubber was reduced and the copolymer became hard. From this result, it can be determined that, as in the case of NDMA and GAM, the grafting was progressed.

(5) Observation by Scanning Probe Microscope (SPM)

Figure 9:
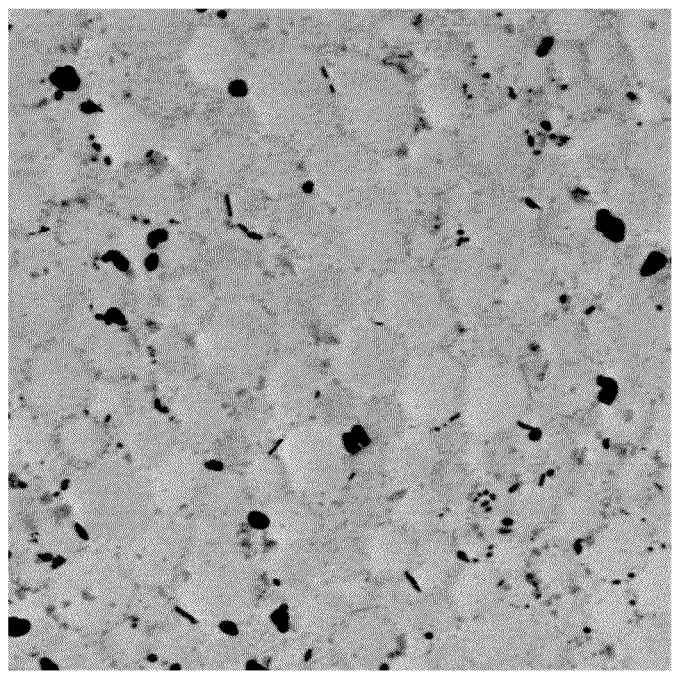
FIG. 9 is an image obtained by scanning probe microscopy (SPM) for deproteinized natural rubber.
Figure 10:
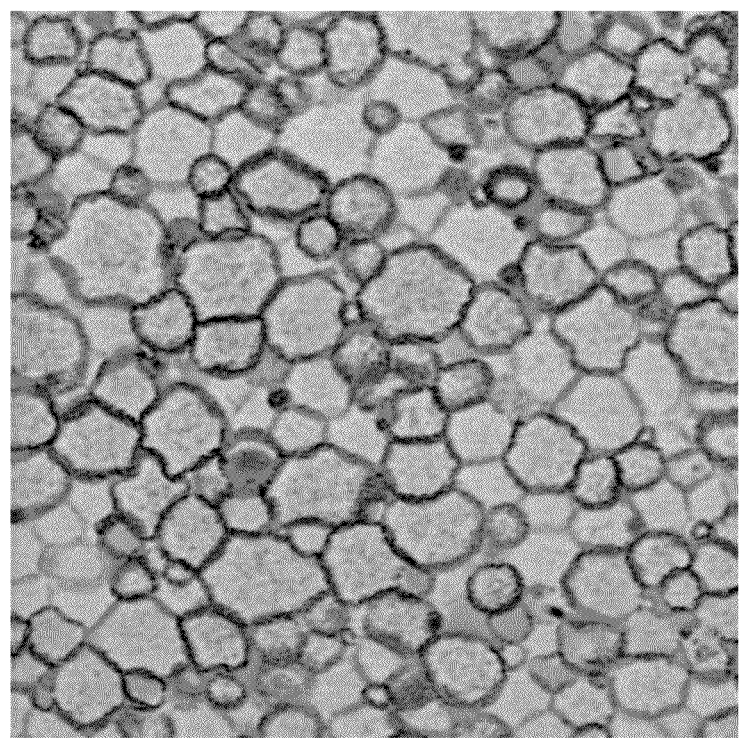
FIG. 10 is an SPM image of a copolymer of Example 10.

The copolymer of Example 10 and the deproteinized natural rubber as a raw material were observed by an SPM (observation range: 10 μm square). FIG. 9 shows an SPM image of the deproteinized natural rubber. FIG. 10 shows an SPM image of the copolymer of Example 10.

When FIG. 9 and FIG. 10 are compared, in the copolymer of Example 10 (FIG. 10), the surrounding of the rubber particles is seen dark. That is, in the copolymer of Example 10, it is apparent that divinylbenzene (multifunctional vinyl monomer) is bonded to the surrounding of the deproteinized natural rubber particles.

INDUSTRIAL APPLICABILITY

In the surface of the modified natural rubber particle according to the present invention, the carbon-carbon double bonds in the graft-copolymerized multifunctional vinyl monomers remain. The carbon-carbon double bonds become reactive sites for crosslinking etc. Accordingly, for example, by photocrosslinking etc., a three-dimensional network structure can be formed in a grafted-polymer layer in a surface of the modified natural rubber particle. Thus, the tensile property, the dimensional stability etc. of rubber materials after the crosslinking are Improved. Such modified natural rubber particle according to the present invention is useful in applications, such as a rubber vibration insulator, as an alternative material of a synthetic rubber.

What is claimed is:

1. A method for producing modified natural rubber particle having carbon-carbon double bonds of vinyl structures assigned to multifunctional vinyl monomers as a source for graft-copolymerization on a surface of the modified natural rubber particle, comprising:

graft-copolymerizing at least one multifunctional vinyl monomer having two or more carbon-carbon double bonds of vinyl structures, none of the carbon-carbon double bonds being protected by cyclodextrins, at least one of the carbon-carbon double bonds being distinguished in reactivity from the other carbon-carbon double bonds, and selected from the group consisting of 3-acryloyloxy-2-hydroxypropyl methacrylate, glycidyl undecylate methacrylic acid-adduct, allyloxy polyethylene glycol-polypropylene glycol mono(meth)acrylates, allyloxy polyalkylene glycol mono(meth)acrylates, allyloxy polyalkyl alcohol mono(meth)acrylates, (vinylphenyl)allylalkanes, and (vinylphenyl)allylalkylene glycols, onto natural rubber particles or deproteinized natural rubber particles.

* * * * *